United States Patent
Chen et al.

(10) Patent No.: US 9,876,435 B2
(45) Date of Patent: Jan. 23, 2018

(54) GATE DRIVE APPARATUS FOR RESONANT CONVERTERS

(71) Applicant: Futurewei Technologies, Inc., Plano, TX (US)

(72) Inventors: Daoshen Chen, Allen, TX (US); Heping Dai, Plano, TX (US); Xujun Liu, Shenzhen (CN); Liming Ye, Frisco, TX (US); Dianbo Fu, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/297,818

(22) Filed: Oct. 19, 2016

(65) Prior Publication Data
US 2017/0040903 A1 Feb. 9, 2017

Related U.S. Application Data

(62) Division of application No. 14/077,406, filed on Nov. 12, 2013, now Pat. No. 9,479,073.

(51) Int. Cl.
*H02M 1/08* (2006.01)
*H02M 3/335* (2006.01)
(Continued)

(52) U.S. Cl.
CPC ......... *H02M 3/33546* (2013.01); *H02M 1/08* (2013.01); *H02M 1/14* (2013.01);
(Continued)

(58) Field of Classification Search
CPC ....... H02M 3/33592; H02M 2001/088; H02M 3/33553; H02M 2001/0058
See application file for complete search history.

(56) References Cited

U.S. PATENT DOCUMENTS

| 5,514,921 A | 5/1996 | Steigerwald |
| 6,169,683 B1 * | 1/2001 | Farrington ........ H02M 3/33592 363/127 |

(Continued)

FOREIGN PATENT DOCUMENTS

| CN | 101106335 A | 1/2008 |
| CN | 1401707440 A | 5/2010 |

(Continued)

OTHER PUBLICATIONS

International Search Report of Patent Cooperation Treaty (PCT), International Application No. PCT/CN2014/090712, Applicant Huawei Technologies Co., Ltd., dated Nov. 10, 2014, 13 pages.

*Primary Examiner* — Harry Behm
(74) *Attorney, Agent, or Firm* — Slater Matsil, LLP

(57) ABSTRACT

A method comprises providing a resonant converter comprising a switching network comprising a first high-side switch, a second high-side switch, a first low-side switch and a second low-side switch, a resonant tank coupled between the switching network and a transformer and a rectifier coupled to a secondary side of the transformer, coupling a driver to the switching network and the rectifier, wherein the driver includes a first winding coupled to the rectifier, a second winding coupled to the first high-side switch and a third winding coupled to the second high-side switch, detecting a signal indicating a soft switching process of the driver and adjusting a resonant frequency of the driver until the resonant frequency of the driver approximately matches a switch frequency of the resonant converter.

20 Claims, 11 Drawing Sheets

(51) Int. Cl.
*H02M 3/338* (2006.01)
*H02M 1/14* (2006.01)
*H02M 1/36* (2007.01)
*H02M 1/088* (2006.01)
*H02M 1/00* (2006.01)
*H02M 7/48* (2007.01)

(52) U.S. Cl.
CPC ........... *H02M 1/36* (2013.01); *H02M 3/3385* (2013.01); *H02M 1/088* (2013.01); *H02M 3/3353* (2013.01); *H02M 3/33553* (2013.01); *H02M 3/33576* (2013.01); *H02M 3/33592* (2013.01); *H02M 7/4807* (2013.01); *H02M 2001/0006* (2013.01); *H02M 2001/0058* (2013.01); *H02M 2007/4818* (2013.01); *Y02B 70/1433* (2013.01); *Y02B 70/1441* (2013.01); *Y02B 70/1491* (2013.01); *Y02P 80/112* (2015.11)

(56) References Cited

U.S. PATENT DOCUMENTS

| | | |
|---|---|---|
| 6,441,652 B1 | 8/2002 | Qian |
| 6,911,848 B2 | 6/2005 | Vinciarelli |
| 2002/0008981 A1 | 1/2002 | Jain et al. |
| 2002/0141206 A1* | 10/2002 | Brkovic ................ H02M 1/088 363/24 |
| 2006/0170043 A1 | 8/2006 | Liu et al. |
| 2007/0109025 A1 | 5/2007 | Liu et al. |
| 2009/0244934 A1 | 10/2009 | Wang et al. |
| 2011/0019454 A1 | 1/2011 | Fotherby |
| 2014/0049297 A1 | 2/2014 | Nagai et al. |

FOREIGN PATENT DOCUMENTS

| | | |
|---|---|---|
| CN | 102355147 A | 2/2012 |
| CN | 202586757 U | 12/2012 |
| CN | 103339857 A | 10/2013 |

* cited by examiner

GATE DRIVE APPARATUS FOR RESONANT CONVERTERS

This application is a divisional of U.S. patent application Ser. No. 14/077,406, filed on Nov. 12, 2013, entitled "Gate Drive Apparatus for Resonant Converters," which application is incorporated herein by reference.

TECHNICAL FIELD

The present invention relates to a resonant converter, and, in particular embodiments, to a lossless gate driver of resonant converters.

BACKGROUND

A telecommunication network power system usually includes an AC-DC stage converting the power from the AC utility line to a 48V DC distribution bus and a DC-DC stage converting the 48V DC distribution bus to a plurality of voltage levels for all types of telecommunication loads. Both stages may comprise isolated DC-DC converters. Isolated DC-DC converters can be implemented by using different power topologies, such as flyback converters, forward converters, half bridge converters, full bridge converters, inductor-inductor-capacitor (LLC) resonant converters and the like.

As technologies further advance, bus converters have been widely employed in the telecommunication industry. The bus voltages may be divided into three categories, a 12V bus voltage converted from a 48V input dc power supply, a 48V bus voltage converted from a 380V input dc power supply and a 12V bus voltage converted from a 380V input dc power supply. A bus converter not only converts the input voltage from a higher level to a lower level, but also provides isolation through a magnetic device such as transformers and/or the like.

The intermediate bus voltage such as 12V may function as an input power bus for a plurality of downstream non-isolated power converters. The downstream non-isolated power converters may be implemented as step-down dc/dc converters such as buck converters, step-up dc/dc converters such as boost converters, linear regulators, any combinations thereof and/or the like. The downstream non-isolated power converters operate under a tight control loop so that fully regulated output voltages are fed into their respective loads.

As power consumption has become more important, there may be a need for high power density and high efficiency bus converters. LLC resonant converters have become the preferred choice for achieving high performance (e.g., high power density and high efficiency) because LLC resonant converters are capable of reducing switching losses through zero voltage switching and/or zero current switching.

SUMMARY OF THE INVENTION

These and other problems are generally solved or circumvented, and technical advantages are generally achieved, by preferred embodiments of the present invention which provide a lossless gate drive circuit for an inductor-inductor-capacitor (LLC) resonant power converter.

In accordance with an embodiment, a method comprises providing a resonant converter comprising a switching network comprising a first high-side switch, a second high-side switch, a first low-side switch and a second low-side switch, a resonant tank coupled between the switching network and a transformer and a rectifier coupled to a secondary side of the transformer, coupling a driver to the switching network and the rectifier, wherein the driver comprises a bridge coupled between a bias voltage and ground, a resonant device coupled to the bridge and a signal transformer having a primary winding coupled to the resonant device, a first secondary winding coupled to the rectifier, a second secondary winding coupled to the first high-side switch and a third secondary winding coupled to the second high-side switch, detecting a signal indicating a soft switching process of the driver and adjusting a resonant frequency of the driver until the resonant frequency of the driver approximately matches a switch frequency of the resonant converter.

In accordance with another embodiment, a method comprises providing a resonant converter comprising a switching network comprising a first high-side switch, a second high-side switch, a first low-side switch and a second low-side switch, a resonant tank coupled between the switching network and a transformer and a rectifier coupled to a secondary side of the transformer, coupling a driver to the switching network and the rectifier, wherein the driver comprises a bridge coupled between a bias voltage and ground, a resonant device coupled to the bridge and a signal transformer comprising a first winding coupled to the rectifier, a second winding coupled to the first high-side switch and a third winding coupled to the second high-side switch, detecting a load level of the resonant converter and adjusting the bias voltage the driver in response to different load conditions.

In accordance with yet another embodiment, a method providing a resonant converter comprising a switching network comprising a first high-side switch, a second high-side switch, a first low-side switch and a second low-side switch, a resonant tank coupled between the switching network and a transformer and a rectifier coupled to a secondary side of the transformer. The method further comprises coupling a driver to the switching network and the rectifier, wherein the driver includes a first winding coupled to the rectifier, a second winding coupled to the first high-side switch and a third winding coupled to the second high-side switch, detecting a signal indicating a soft switching process of the driver and adjusting a resonant frequency of the driver until the resonant frequency of the driver approximately matches a switch frequency of the resonant converter.

An advantage of a preferred embodiment of the present invention is improving the efficiency of an LLC resonant converter through a lossless gate drive circuit.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a lossless gate driver for an inductor-inductor-capacitor (LLC) resonant converter. The invention may also be applied, however, to a variety of resonant converters. Hereinafter, various embodiments will be explained in detail with reference to the accompanying drawings.

Figure 1:
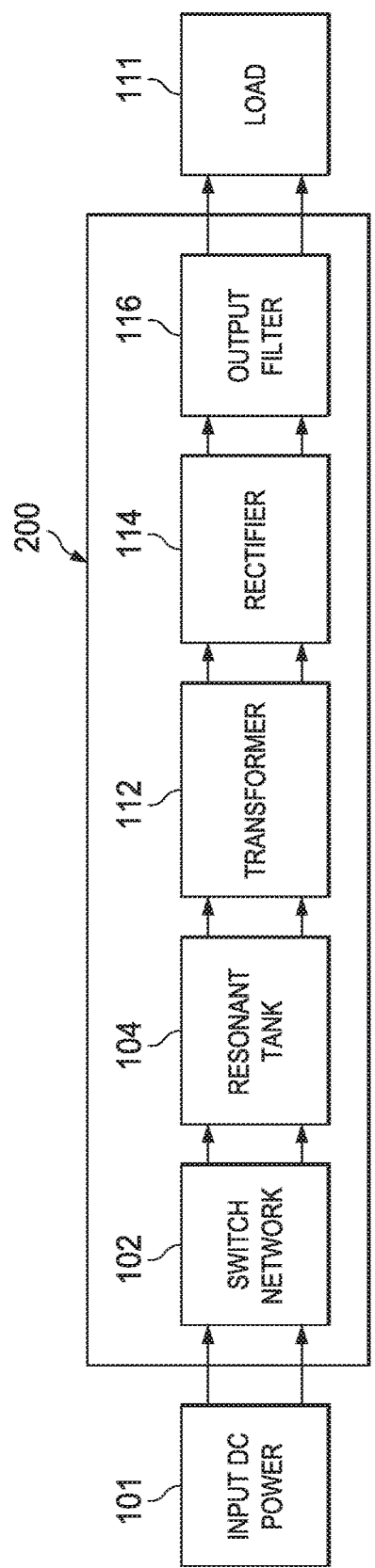
FIG. 1 illustrates a block diagram of an LLC resonant converter in accordance with various embodiments of the present disclosure.

FIG. 1 illustrates a block diagram of an LLC resonant converter in accordance with various embodiments of the present disclosure. The LLC resonant converter 200 is coupled between an input dc power source 101 and a load 111. The input dc power source 101 may be telecommunication power supplies converting a utility line voltage to a dc voltage. Alternatively, the input dc power source 101 may be a solar panel array. Furthermore, the input dc power source 101 may be an energy storage device such as rechargeable batteries, fuel cells and/or the like. The load 111 represents the power consumed by a circuit coupled to the LLC resonant converter 200. Alternatively, the load 111 may refer to downstream converters coupled to the output of the LLC resonant converter 200.

The LLC resonant converter 200 may comprise a switch network 102, a resonant tank 104, a transformer 112, a rectifier 114 and an output filter 116. As shown in FIG. 1, the switch network 102, the resonant tank 104, the transformer 112, the rectifier 114 and the output filter 116 are coupled to each other and connected in cascade between the input dc power source 101 and the load 111.

The switch network 102 may comprise primary side switches of a full bridge resonant converter according to some embodiments. Alternatively, the switch network 102 may be of the primary side switches of other bridge converters such as a half-bridge resonant converter, a push-pull resonant converter and the like. The detailed configuration of the switch network 102 will be described below with respect to FIG. 2.

The resonant tank 104 may be implemented in a variety of ways. For example, the main resonant tank comprises a series resonant inductor, a parallel resonant inductor and a series resonant capacitor (shown in FIG. 2 respectively).

The series resonant inductor and the parallel resonant inductor may be implemented as external inductors. A person skilled in the art will recognize that there may be many variation, alternatives and modifications. For example, the series resonant inductor may be implemented as a leakage inductance of the transformer 112.

In sum, the resonant tank 104 includes three key resonant elements, namely the series resonant inductor, the series resonant capacitor and the parallel resonant inductor. Such a configuration is commonly referred to as an LLC resonant converter. According to the operating principle of LLC resonant converters, at a switching frequency approximately equal to the resonant frequency of the resonant tank 104, the resonant tank 104 helps to achieve zero voltage switching for the primary side switching elements and zero current switching for the secondary side switching elements.

The LLC resonant converter 200 may further comprise a transformer 112, a rectifier 114 and an output filter 116. The transformer 112 provides electrical isolation between the primary side and the secondary side of the LLC resonant converter 200. In accordance with an embodiment, the transformer 112 may be formed of two transformer windings, namely a primary transformer winding and a secondary transformer winding. Alternatively, the transformer 112 may have a center tapped secondary so as to have three transformer windings including a primary transformer winding, a first secondary transformer winding and a second secondary transformer winding.

It should be noted that the transformers described above and throughout the description are merely examples, which should not unduly limit the scope of the claims. One of ordinary skill in the art would recognize many variations, alternatives, and modifications. For example, the transformer 112 may further comprise a variety of bias windings and gate drive auxiliary windings.

The rectifier 114 converts an alternating polarity waveform received from the output of the transformer 112 to a single polarity waveform. When the transformer 112 is of a center tapped secondary, the rectifier 114 may be formed of a pair of switching elements such as n-type metal oxide semiconductor (NMOS) transistors. Alternatively, the rectifier 114 may be formed of a pair of diodes. On the other hand, when the transformer 112 is of a single secondary winding, the rectifier 114 may be a full-wave rectifier coupled to the single secondary winding of the transformer 112.

Furthermore, the rectifier 114 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 114 are well known in the art, and hence are not discussed herein.

The output filter 116 is used to attenuate the switching ripple of the LLC resonant converter 200. According to the operation principles of isolated dc/dc converters, the output filter 116 may be an L-C filter formed by an inductor and a plurality of capacitors. One person skilled in the art will recognize that some isolated dc/dc converter topologies such as forward converters may require an L-C filter. On the other hand, some isolated dc/dc converter topologies such as LLC resonant converters may include an output filter formed by a capacitor. One person skilled in the art will further recognize that different output filter configurations apply to different power converter topologies as appropriate. The configuration variations of the output filter 116 are within various embodiments of the present disclosure.

Figure 2:
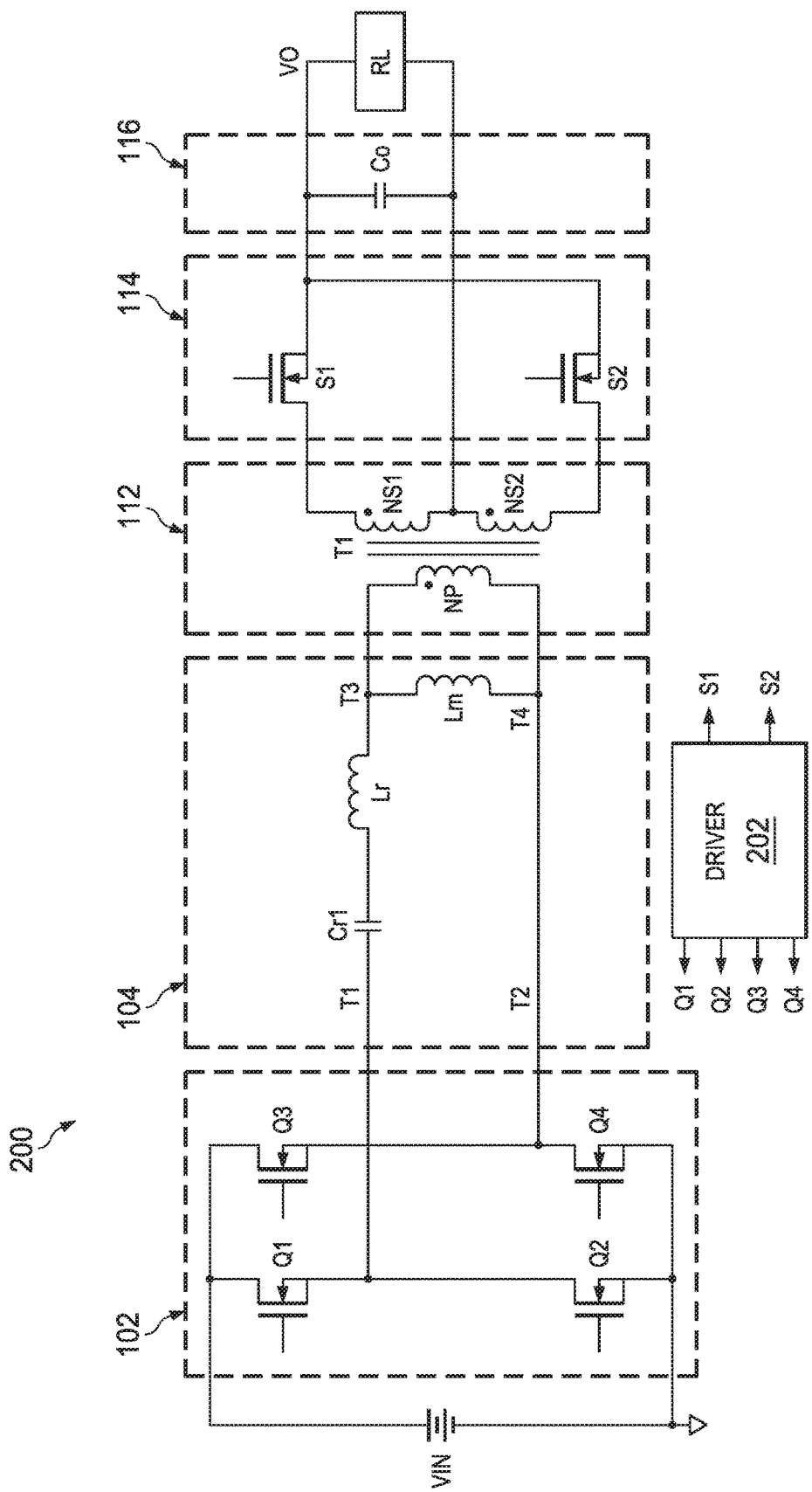
FIG. 2 illustrates a schematic diagram of the LLC resonant converter shown in FIG. 1 in accordance with various embodiments of the present disclosure.

FIG. 2 illustrates a schematic diagram of the LLC resonant converter shown in FIG. 1 in accordance with various embodiments of the present disclosure. The switch network 102 includes four switching elements, namely Q1, Q2, Q3 and Q4. As shown in FIG. 2, a first pair of switching elements Q1 and Q2 are connected in series. A second pair of switching elements Q3 and Q4 are connected in series. The common node of the switching elements Q1 and Q2 is coupled to a first input terminal T1 of the resonant tank 104. Likewise, the common node of the switching elements Q3 and Q4 is coupled to a second input terminal T2 of the resonant tank 104.

The switching elements Q1, Q2, Q3 and Q4 form a primary side switching network of a full bridge resonant converter. According to some embodiments, switching elements Q1, Q2, Q3 and Q4 are implemented as MOSFET or MOSFETs connected in parallel, any combinations thereof and/or the like.

According to alternative embodiments, the primary switches (e.g., switch Q1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full bridge LLC resonant converter (e.g., full bridge LLC resonant converter shown in FIG. 2), the LLC resonant converter 200 shown in FIG. 2 may have many variations, alternatives, and modifications. For example, half bridge converters, push-pull converters may be alternatively employed. The full bridge resonant converter illustrated herein is limited solely for the purpose of clearly illustrating the inventive aspects of the various embodiments. The present invention is not limited to any particular power topology.

It should further be noted that while FIG. 2 illustrates four switches Q1, Q2, Q3, and Q4, various embodiments of the present disclosure may include other variations, modifications and alternatives. For example, a separate capacitor may be connected in parallel with each switch of the primary side switching network. Such a separate capacitor helps to better control the timing of the resonant process of the LLC resonant converter 200.

FIG. 2 further illustrates the resonant tank 104 is coupled between the switch network 102 and the transformer 112. The resonant tank 104 is formed by a series resonant inductor Lr, a series resonant capacitor Cr1 and a parallel inductance Lm. As shown in FIG. 2, the series resonant inductor Lr and the series resonant capacitor Cr1 are connected in series and further coupled to the primary side of the transformer 112.

It should be noted while FIG. 2 shows the series resonant inductor Lr is an independent component, the series resonant inductor Lr may be replaced by the leakage inductance of the transformer 112. In other words, the leakage inductance (not shown) may function as the series resonant inductor Lr.

The transformer 112 may be of a primary winding and a center tapped secondary winding. The primary winding is coupled to terminals T3 and T4 of the resonant tank 104 as shown in FIG. 2. The secondary winding is coupled to the load 111 through the rectifier 114, which is formed by switches S1 and S2. The rectifier 114 formed by switches S1 and S2 may be alternatively referred to as a synchronous rectifier 114 throughout the description.

It should be noted the transformer structure shown in FIG. 2 is merely an example. One person skilled in the art will recognize many alternatives, variations and modification. For example, the secondary side of the transformer 112 may be a single winding. As a result, the secondary side may employ a synchronous rectifier formed by four switching elements (a.k.a. full wave rectifier). The operation principle of a synchronous rectifier coupled to a single secondary winding or a center tapped transformer secondary side is well known, and hence is not discussed in further detail herein.

It should further be noted that the power topology of the LLC resonant converter 200 may be not only applied to the rectifier as shown in FIG. 2, but also applied to other secondary configurations, such as voltage doubler rectifiers, current doubler rectifiers, any combinations thereof and/or the like.

FIG. 2 further illustrates the LLC resonant converter 200 may comprise a driver 202. As shown in FIG. 2, the driver 202 is capable of generating six gate drive signals for the primary switches Q1, Q2, Q3 and Q4, and the secondary switches S1 and S2. Since the driver 202 is able to provide gate drive signals for both the primary side switches and the secondary side switches, the driver 202 may comprise an isolation device such as a signal transformer and/or the like. In some embodiments, the driver 202 is a lossless gate driver. Throughout the description, the driver 202 may be alternatively referred to as the lossless gate driver 202. Several illustrative implementations of the driver 202 will be described below with respect to FIGS. 3-9.

One skilled in the art will recognize that a single driver (e.g., driver 202 shown in FIG. 2) providing drive signals for both the primary side and the secondary side is simply one manner of generating the drive signals and that other and alternate embodiment drivers could be employed (such as employing two separate drivers) and that other circuits, (e.g., lossless gate drive circuits, a pulse width modulation (PWM) gate drive circuits, etc.) could be employed for this function.

Figure 3:
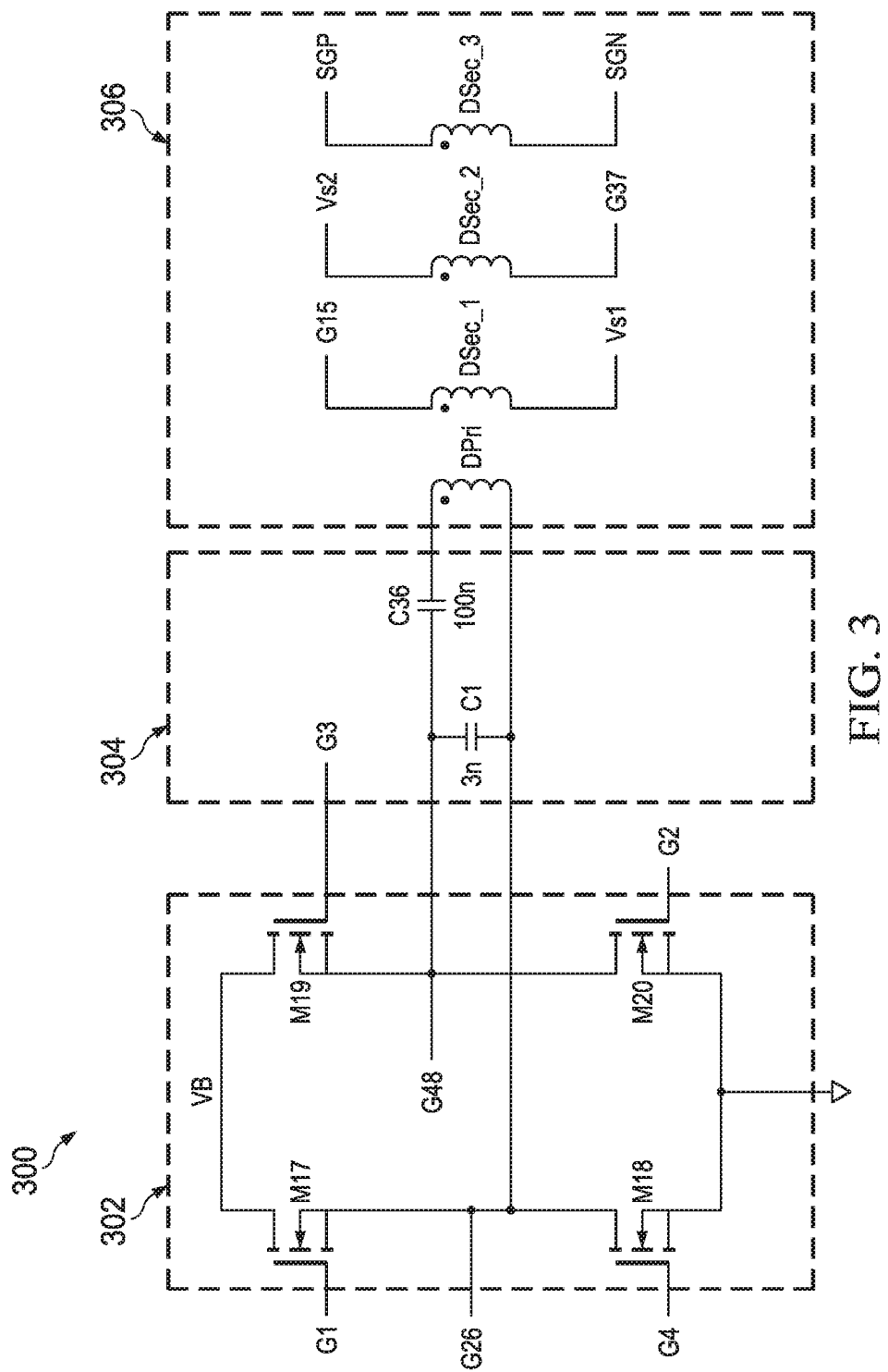
FIG. 3 illustrates a first illustrative implementation of the driver shown in FIG. 2 in accordance with various embodiments of the present disclosure.

FIG. 3 illustrates a first illustrative implementation of the driver shown in FIG. 2 in accordance with various embodiments of the present disclosure. In some embodiments, the driver 300 is a lossless gate driver. Throughout the description, the driver 300 is alternatively referred to as the lossless gate driver 300.

The lossless gate driver 300 comprises an H-bridge 302, a resonant tank 304 and a signal transformer 306. As shown in FIG. 3, the H-bridge 302 is formed by transistors M17, M18, M19 and M20. Transistor M17 and transistor M18 are connected in series between a bias voltage VB and ground. The common node of transistor M17 and transistor M18 is defined as G26 as shown in FIG. 3. In some embodiments, G26 is used as a first low side gate drive signal (e.g., the gate drive signal for the switch Q2 shown in FIG. 2).

Transistor M19 and transistor M20 are connected in series between the bias voltage VB and ground. The common node of transistor M19 and transistor M20 is defined as G48 as shown in FIG. 3. In some embodiments, G48 is used as a second low side gate drive signal (e.g., the gate drive signal for the switch Q4 shown in FIG. 2).

According to some embodiments, transistors M17, M18, M19 and M20 are implemented as N-channel MOSFETs, P-channel MOSFETs, any combinations thereof and/or the like. In some embodiments, transistors M17 and M19 are driven by a plurality of narrow PWM pulses. The narrow PWM pulses are of a duty cycle from about 5% to about 25%. Alternatively, the duty cycle of the narrow PWM pulses may be less than 40%. Transistors M18 and M20 are driven by a plurality of wide PWM pulses. The wide PWM pulses are of a duty cycle approximately equal to 50%.

It should be noted that the duty cycle of the transistors M17 and M19 may be adjustable. More particularly, in order to improve the gate drive speed of the switches of the LLC resonant converter 200, the duty cycle of the transistors M17 and M19 may be adjusted accordingly. In alternative embodiments, the duty cycle of the transistors M18 and M20 may be adjustable too in order to achieve better gate driving performance. The duty cycle of the transistors M18 and M20 may be adjusted to a range from about 40% to about 60%. It should be noted that the duty cycle of the transistors M18 and M20 is greater than the duty cycle of the transistors M17 and M19.

The resonant tank 304 may comprise capacitor C1, the magnetizing inductance (not shown) of the signal transformer 306 and the parasitic gate capacitances (not shown) of the main power switches (e.g., Q1, Q2, Q3, Q4, S1 and S2 in FIG. 2) of the LLC resonant converter 200. In some embodiments, the capacitance of C1 is equal to 3 nF.

In operation, the magnetizing inductance, the capacitor C1 and the parasitic capacitances may form a resonant process in which a resonant inductor current may charge and discharge the gate capacitors of the main power switches (e.g., Q1 in FIG. 2) of the LLC resonant converter 200. During the resonant process, the resonant tank 304 helps to return a portion of the energy at the gates of the main power switches to the source such as the bias voltage VB. As such, part of the gate drive energy is recovered so as to achieve lossless gate driving.

It should be noted that the capacitor C36 is not part of the resonant tank 304. The capacitor C36 helps to balance the magnetic flux of the signal transformer 306. In some embodiments, the capacitance of C36 is equal to 100 nF.

The signal transformer 306 comprises a primary winding DPri, a first secondary winding DSec_1, a second secondary winding DSec_2 and a third secondary winding $DSec_{13}3$. In some embodiments, the output voltage across G15 and Vs1 is used to drive a first high side switch (e.g., switch Q1 shown in FIG. 2). The output voltage across G37 and Vs2 is used to drive a second high side switch (e.g., switch Q3 shown in FIG. 2). Signals SGP and SGN are used to drive the secondary switches S1 and S2 respectively. It should be noted while FIG. 3 shows G26 is used as the first low side gate drive signal (e.g., the gate drive signal for the switch Q2 shown in FIGS. 2) and G48 is used as a second low side gate drive signal (e.g., the gate drive signal for the switch Q4 shown in FIG. 2), the low side switches such as Q2 and Q4 in FIG. 2 can be driven by a winding such as DSec_1 and DSec_2 shown in FIG. 3. In other words, the output voltages at G15 and G37 can be used to drive low side switches.

The gate drive voltage rating (e.g., the turn-on threshold voltage) of the low side switches, high side switches and the secondary side switches (power switches of the main LLC resonant converter such as the LLC resonant converter 200 shown in FIG. 2) is related to the turns ratio of the signal transformer 306.

The gate drive turn-on threshold voltage of the low side switches such as Q2 and Q4 is defined as Vth_PS_L. The gate drive turn-on threshold voltage of the first high side switch such as Q1 is defined as Vth_PS_H1. The gate drive turn-on threshold voltage of the second high side switch such as Q3 is defined as Vth_PS_H2. The gate drive turn-on threshold voltage of the secondary side switches such as S1 and S2 is defined as Vth_SS.

In some embodiments, the turns ratio (Dpri/DSec_1/DSec_2) of the signal transformer 306 is approximately equal to Vth_PS_L/Vth_PS_H1/Vth_PS_H2. The turns ratio (Dpri/Dsec_3) is greater than or equal to Vth_PS_L/Vth_SS.

The bias voltage VB is not fixed. The voltage level of VB may vary depending on different operating modes. For example, VB may change during a startup process of the LLC resonant converter 200. Furthermore, VB may vary in response to different load conditions. VB may be of a low voltage level when the LLC resonant converter 200 operates at a light load condition. On the other hand, VB may be of a high voltage level when the LLC resonant converter 200 operates at a full/heavy load condition.

Figure 4:
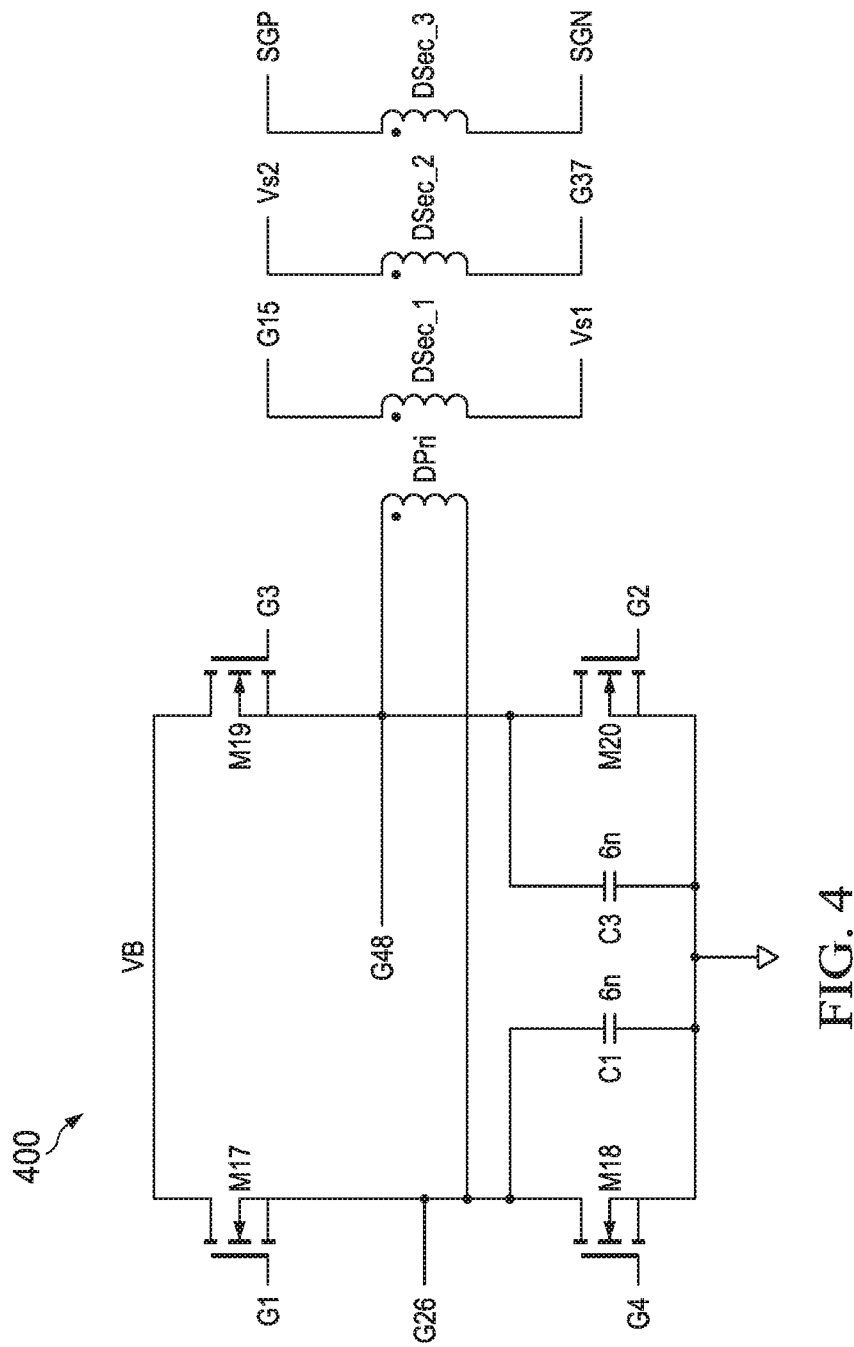
FIG. 4 illustrates a second illustrative implementation of the driver shown in FIG. 2 in accordance with various embodiments of the present disclosure.

FIG. 4 illustrates a second illustrative implementation of the driver shown in FIG. 2 in accordance with various embodiments of the present disclosure. The driver 400 shown in FIG. 4 is similar to the driver 300 shown in FIG. 3 except that the capacitor C1 shown in FIG. 3 is replaced by two capacitors. As shown in FIG. 4, a first capacitor C1 is connected in parallel with the transistor M18. A second capacitor C3 is connected in parallel with the transistor M20. In some embodiments, the capacitance of the first capacitor C1 is equal to the capacitance of the second capacitor C3. In particular, the capacitance of the first capacitor C1 is equal to 6 nF. The capacitance of the second capacitor C2 is equal to 6 nF.

It should be noted that the values given above are selected purely for demonstration purposes and are not intended to limit the various embodiments of the present invention to any particular values. A person skilled in the art will recognize that, depending on different application and design needs, the resistance and capacitance recited above may be changed to different values.

In operation, the magnetizing inductance, the first capacitor C1, the second capacitor C3 and the parasitic capacitances of the main power switches may form a resonant process in which a resonant inductor current may charge and discharge the gate capacitors of the main power switches (e.g., Q1 in FIG. 2). During the resonant process, the resonant tank formed by C1, C3, the magnetizing inductance and the parasitic capacitances may help to return a portion of the energy at the gates of the main power switches to the source such as the bias voltage VB. As such, part of the gate drive energy is recovered so as to achieve lossless gate driving.

It should be noted that while FIG. 4 shows C1 is connected in parallel with the transistor M18 and C3 is connected in parallel with the transistor M20. A person skilled in the art will recognize that the configuration shown in FIG. 4 is merely an example. There may be many alternatives, variations and modifications. For example, C1 and C3 may be in parallel with transistors M17 and M19 respectively. In addition, C1 may be in parallel with M17 and C3 may be in parallel with M20. Alternatively, C1 may be in parallel with M18 and C3 may be in parallel with M19.

Figure 5:
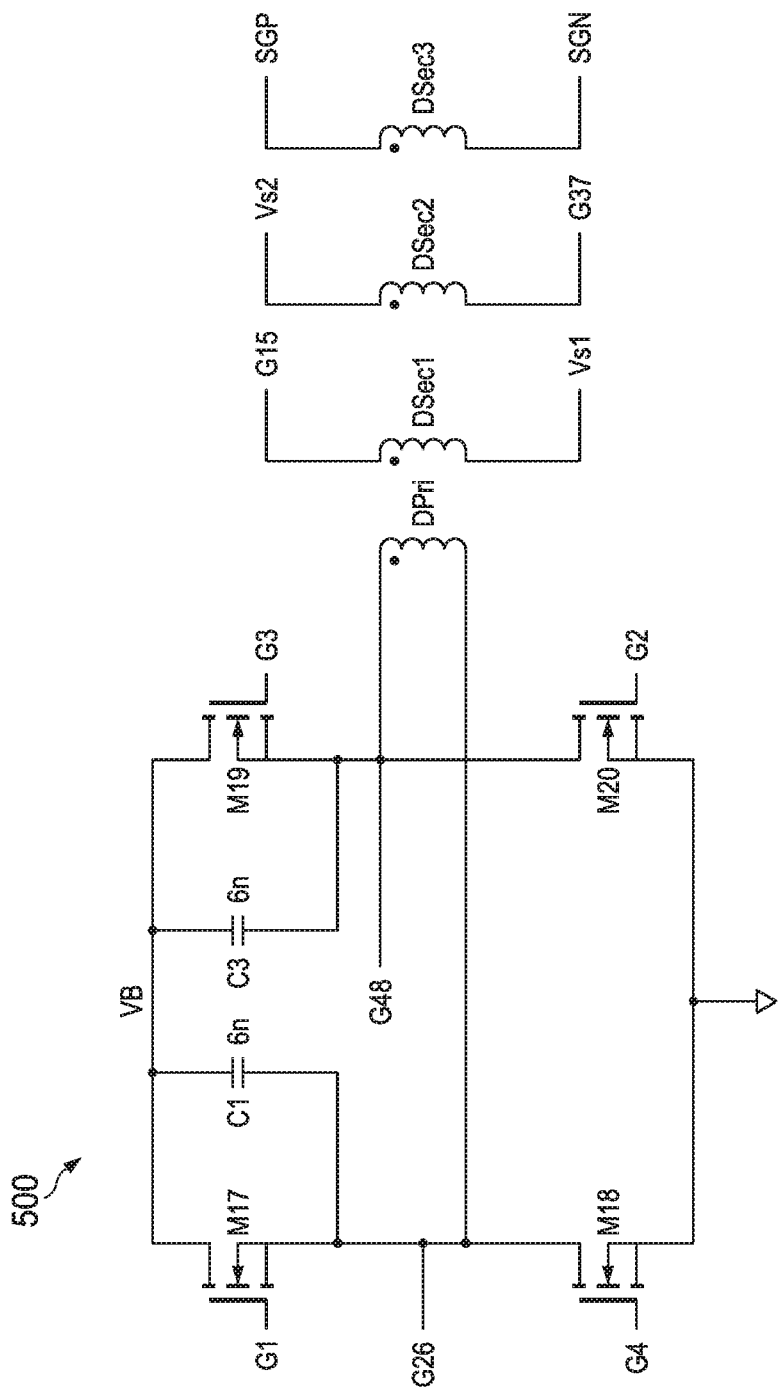
FIG. 5 illustrates a third illustrative implementation of the driver shown in FIG. 2 in accordance with various embodiments of the present disclosure.

FIG. 5 illustrates a third illustrative implementation of the driver shown in FIG. 2 in accordance with various embodiments of the present disclosure. The driver 500 shown in FIG. 5 is similar to the driver 400 shown in FIG. 4 except that the first capacitor C1 and the second capacitor C3 are connected in parallel with the transistor M17 and transistor M19 respectively. In some embodiments, the capacitance of the first capacitor C1 is equal to 6 nF. The capacitance of the second capacitor C2 is equal to 6 nF. The operation principle of the driver 500 is similar to that of the driver 400 shown in FIG. 4, and hence is not discussed in further detail to avoid unnecessary repetition.

Figure 6:
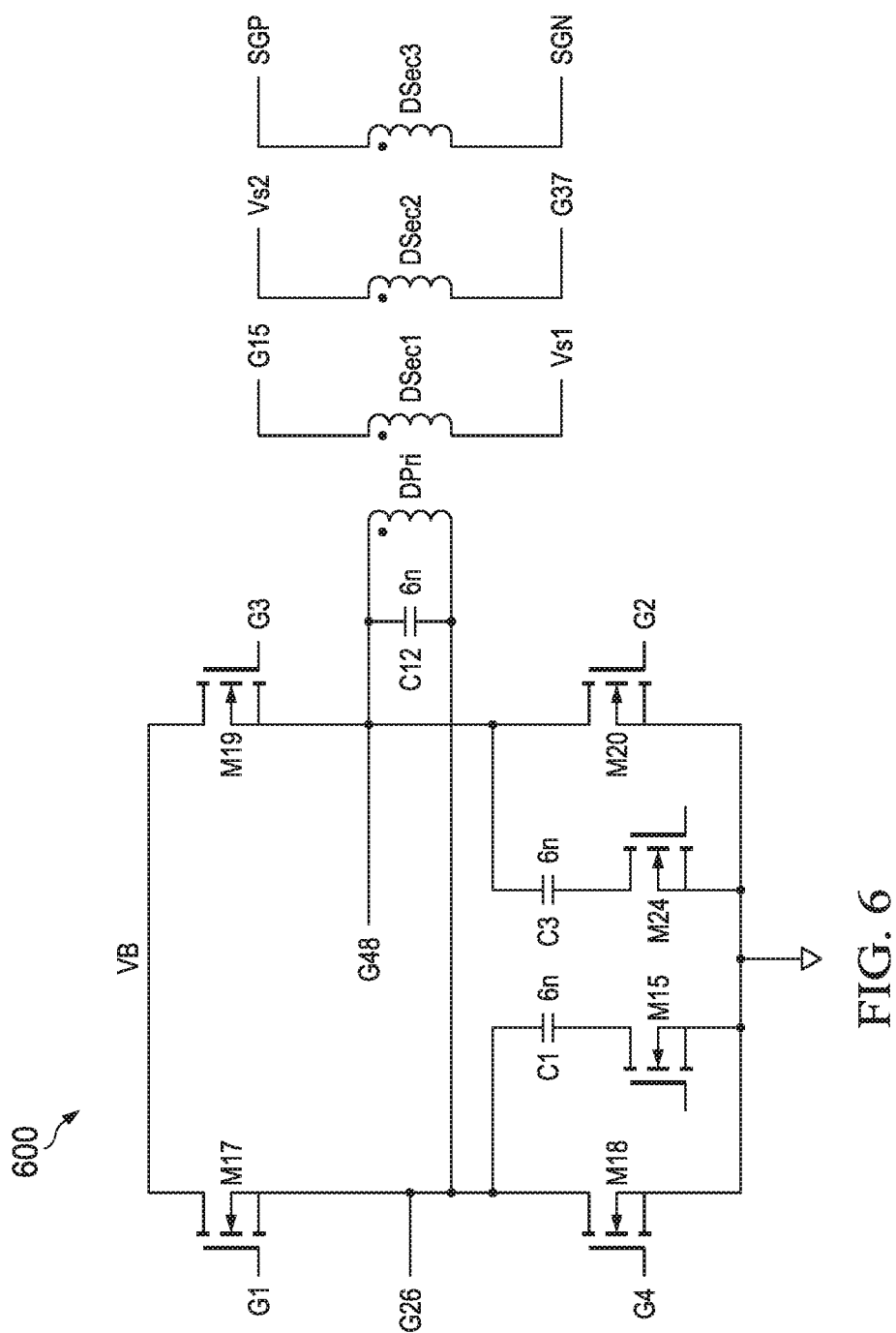
FIG. 6 illustrates a fourth illustrative implementation of the driver shown in FIG. 2 in accordance with various embodiments of the present disclosure.

FIG. 6 illustrates a fourth illustrative implementation of the driver shown in FIG. 2 in accordance with various embodiments of the present disclosure. The driver 600 shown in FIG. 6 is similar to the driver 400 shown in FIG. 4 except that the first capacitor C1 and the second capacitor C3 are connected in series with the transistor M15 and the transistor M24 respectively. Since the first capacitor C1 is switchable through turning on/off the transistor M15, the series-connected C1 and M15 is alternatively referred to a switchable capacitor C1. Likewise, the series-connected C3 and M24 is alternatively referred to a switchable capacitor C3 throughout the description.

It should be noted that while FIG. 6 shows a single switchable capacitor (e.g., switchable capacitor C1) is connected in parallel with the transistor (e.g., transistor M1), the driver 600 may accommodate any number of switchable capacitors. In other words, there may be a plurality of switchable capacitors are connected in parallel with the transistor (e.g., M18 and M20) of the driver 600.

In operation, in response to a frequency adjustment request from a controller (not shown), the actual capacitance connected to each transistor (e.g., M18 and M20) may vary through turning on/off the switches (e.g., M15 and M24). As such, the resonance process of the driver 600 may be fine-tuned so as to match the resonant frequency of the resonant tank 104 of the LLC resonant converter 200. An example of applying this control mechanism to a lossless gate driver will be described below with respect to FIGS. 9-11.

It should be noted that while FIG. 6 shows the switchable capacitor C1 is connected in parallel with the transistor M18 and the switchable capacitor C3 is connected in parallel with the transistor M20. A person skilled in the art will recognize that the configuration shown in FIG. 6 is merely an example. There may be many alternatives, variations and modifications. For example, the switchable capacitors C1 and C3 may be in parallel with transistors M17 and M19 respectively. In addition, the switchable capacitor C1 may be in parallel with M17 and the switchable capacitor C3 may be in parallel with M20. Alternatively, the switchable capacitor C1 may be in parallel with M18 and the switchable capacitor C3 may be in parallel with M19. Furthermore, the capacitor C12 can be replaced by a switchable capacitor such as the switchable capacitor C1. In addition, a switchable capacitor can be connected in parallel with the capacitor C12.

Figure 7:
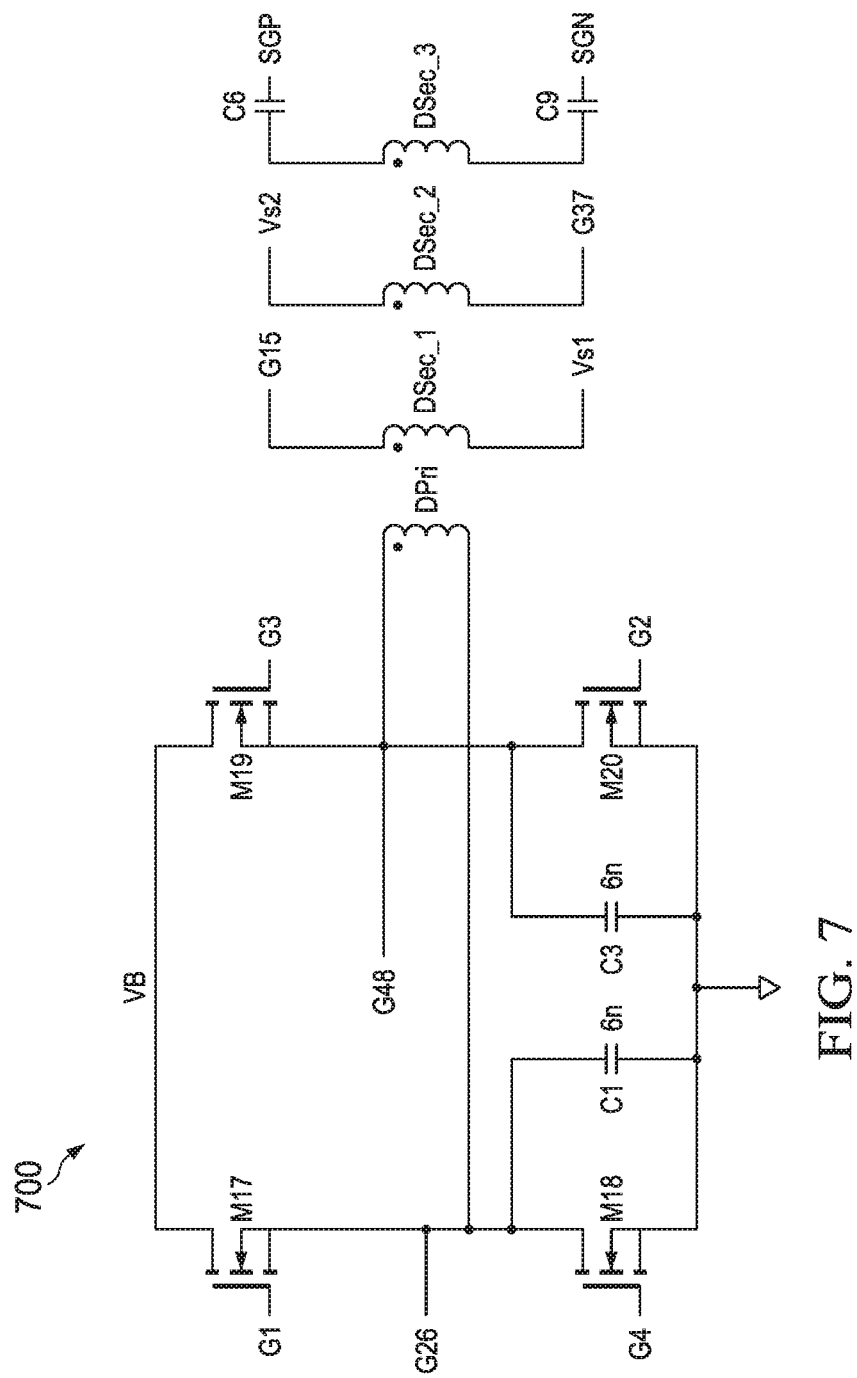
FIG. 7 illustrates a fifth illustrative implementation of the driver shown in FIG. 2 in accordance with various embodiments of the present disclosure.

FIG. 7 illustrates a fifth illustrative implementation of the driver shown in FIG. 2 in accordance with various embodiments of the present disclosure. The driver 700 shown in FIG. 7 is similar to the driver 400 shown in FIG. 4 except that the capacitors C6 and C9 are added into one of the secondary side winding of the signal transformer. In some embodiments, the capacitance of the first capacitor C6 is equal to 47 nF. The capacitance of the second capacitor C9 is equal to 47 nF.

As shown in FIG. 7, capacitors C6 and C9 are connected in series with the secondary side winding Dsec_3. In some embodiments, depending on different applications and design needs, there may be a resistor (not shown) connected in parallel with the capacitor (e.g., capacitor C6). The capacitors C6 and C9 may function as a divider, through which the gate drive voltage level and speed may be controlled accordingly.

In addition, the divider formed by C6 and C9 may help to provide an appropriate gate drive voltage when an exact turns ratio of the signal transformer is not viable. For example, as described above with respect to FIG. 3, it is desirable to have the turns ratio (Dpri/Dsec_3) of the signal transformer 306 equal to Vth_PS_L/Vth_SS. However, it is not viable to obtain the exact turns ratio at some applications. The divider is introduced to further fine-tune the voltage applied to the gates of the power switches so that the gate drive voltages at the outputs of the driver match their respective turn-on threshold voltages of the LLC resonant converter 200. It should be noted that this technique is applicable to the gate driving windings for the primary side switches if needed.

Figure 8:
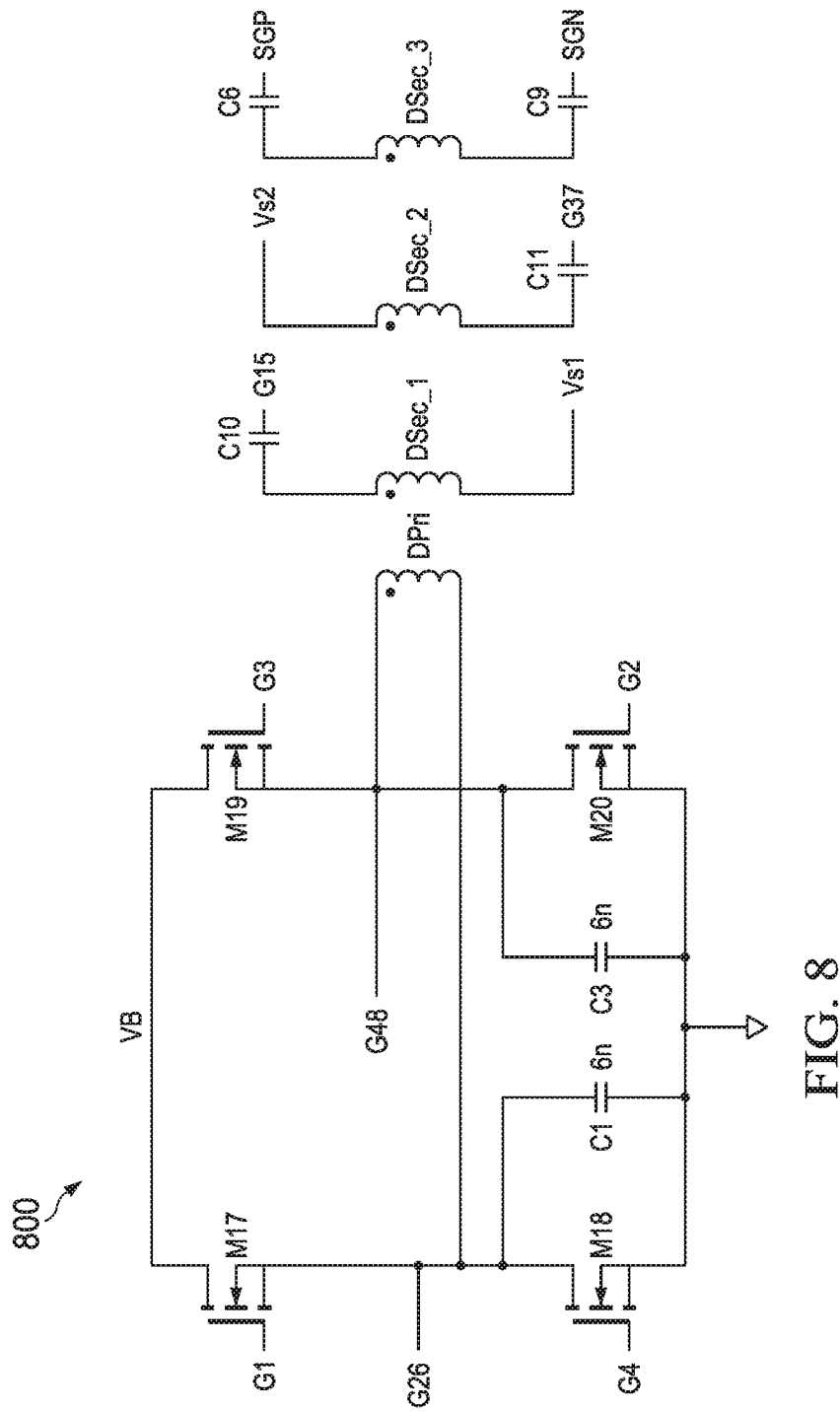
FIG. 8 illustrates a sixth illustrative implementation of the driver shown in FIG. 2 in accordance with various embodiments of the present disclosure.

FIG. 8 illustrates a sixth illustrative implementation of the driver shown in FIG. 2 in accordance with various embodiments of the present disclosure. The driver 800 shown in FIG. 8 is similar to the driver 700 shown in FIG. 7 except that two additional capacitors C10 and C11 are added into the secondary side windings DSec_1 and DSec_2 respectively. In some embodiments, the capacitance of the first capacitor C10 is equal to 47 nF. The capacitance of the second capacitor C11 is equal to 47 nF.

In some embodiments, the capacitors C10 and C11 may function as a divider, through which the gate drive speed may be controlled accordingly.

Figure 9:
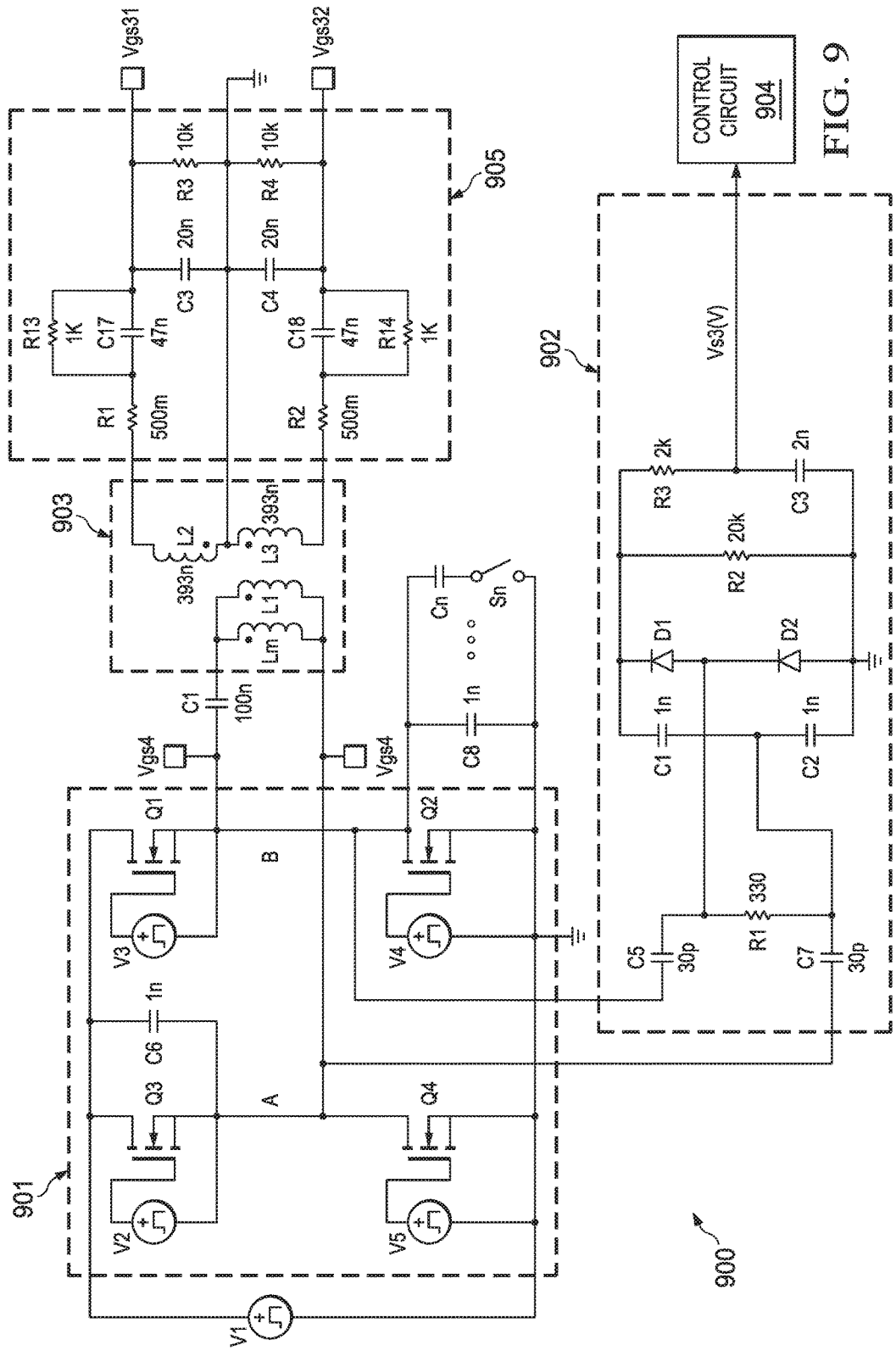
FIG. 9 illustrates a schematic diagram of a lossless gate drive circuit having a maximum efficiency point tracking (MEPT) control mechanism in accordance with various embodiments of the present disclosure.

FIG. 9 illustrates a schematic diagram of a lossless gate drive circuit having a maximum efficiency point tracking (MEPT) control mechanism in accordance with various embodiments of the present disclosure. The lossless gate drive circuit 900 includes an H-bridge 901, a resonant device, a signal transformer 903, a secondary stage 905, a MEPT detector 902 and a control circuit 904.

The H-bridge 901 includes four switches, namely Q1, Q2, Q3 and Q4. The connection and the operating principle of these four switches are similar to those shown in FIG. 3, and hence are not discussed herein.

The resonant device may comprise a fixed capacitance, parasitic capacitances of the power switches (not shown) coupled to the outputs of the lossless gate drive circuit 900, an inductor L4 and an adjustable capacitance.

The fixed capacitance is formed by a capacitor C6 and a capacitor C8. As shown in FIG. 9, the capacitor C6 is connected in parallel with the switch Q3. The capacitor C8 is connected in parallel with the switch Q2.

It should be noted that the fixed capacitance of the lossless gate drive circuit 900 shown in FIG. 9 is merely an example. Other configurations of the capacitors such as the fixed capacitance configurations shown in FIGS. 3-8 are also within the contemplated scope of the invention.

The adjustable capacitance may be implemented as a plurality of capacitors connected in parallel with the capacitor C8. More particularly, each capacitor (e.g., capacitor Cn) is connected in series with an auxiliary switch (e.g., Sn) to form a switchable capacitor. When the auxiliary switch is turned on, the switchable capacitor is connected in parallel with the capacitor C8. As a result, the total capacitance of the resonant device is increased. On the other hand, when the auxiliary switch is turned off, the switchable capacitor is disconnected from the resonant device. As a result, the total capacitance of the resonant device is reduced. As shown in FIG. 9, there may be a plurality of capacitors and their respective auxiliary switches are connected in parallel with the capacitor C8. In some embodiments, the capacitance of the capacitor C8 is equal to 1 nF. As shown in FIG. 9, a plurality of switchable capacitors may form a switchable capacitor bank, which is connected in parallel with the capacitor C8. By turning on/off the auxiliary switches of the switchable capacitor bank, a variety of capacitances can be obtained.

It should be noted that the switchable capacitor bank of the lossless gate drive circuit 900 shown in FIG. 9 is merely an example. Other configurations of the switchable capacitor bank are also within the contemplated scope of the invention. For example, the switchable capacitor bank may be connected in parallel with the capacitor C6. Furthermore, two switchable capacitor banks may be connected in parallel with the capacitor C6 and the capacitor C8 respectively.

In some embodiments, the magnetizing inductance of the signal transformer 903 is about 1.1 uH. The signal transformer 903 may further comprise a leakage inductance (not shown) connected in series with the primary side of the signal transformer 903.

The signal transformer 903 includes a primary winding L1, a first secondary winding L2 and a second secondary winding L3. The turns ratio of the signal transformer 902 is 5:3 in accordance with some embodiments.

The secondary stage 905 has inputs coupled to the secondary windings L2 and L3 of the signal transformer 903 respectively and outputs Vgs31 and Vgs32 coupled to the gates of a synchronous rectifier of an LLC resonant converter 200 respectively.

The secondary stage 905 includes resistors R1, R2, R3, R4, R13 and R4, and capacitors C3, C4, C17 and C18. As shown in FIGS. 9, C3, C17, R3 and R13 may form a first divider, through which the gate drive voltage Vgs31 may be adjusted depending on different applications and design needs. Likewise, C4, C18, R4 and R14 may form a second divider, through which the gate drive voltage Vgs32 may be adjusted depending on different applications and design needs.

The MEPT detector 902, as shown in FIG. 9, detects a voltage signal across node A and node B. In some embodiments, when the resonant frequency of the lossless gate drive circuit 900 is approximately equal to the switching frequency of the resonant tank of the LLC resonant converter 200, the magnitude of the voltage across node A and node B is reduced. On the other hand, when the resonant frequency of the lossless gate drive circuit 900 is away from the switching frequency of the resonant tank of the LLC resonant converter 200, the magnitude of the voltage across node A and node B is increased.

In some embodiments, the MEPT detector 902 detects the voltage across node A and node B. The MEPT detector 902 sends the detected signal to the control circuit 904. The control circuit 904 compares the detected signal with a predetermined threshold or finds a lowest point of the detected signal.

The lowest point of the detected signal indicates the resonant frequency of driver is approximately equal to the switch frequency of the resonant converter. If the detected signal is greater than the lowest point, the control circuit 904 adjusts the resonant frequency of the driver through turning on/off the switchable capacitors until the resonant frequency of driver approximately matches the switch frequency of the resonant converter. As a result, the lossless gate drive circuit 900 is forced to operate at a resonant frequency close to the switching frequency of the LLC resonant converter 200. Such a resonant frequency helps the LLC resonant converter as well as the lossless gate drive circuit 900 achieve higher efficiency.

One advantageous feature of having the MEPT detector 902 shown in FIG. 9 is that the MEPT detector 902 and the control circuit 904 may form an adaptive control loop. Such an adaptive control loop helps the lossless gate drive circuit 900 operate at a resonant frequency matching the switching frequency of the LLC resonant converter 200. In other words, a variety of factors such as noise, parasitic parameters and/or the like may cause the actual resonant frequency of the lossless gate drive circuit 900 not equal to the natural resonant frequency calculated based upon theoretical models. The control circuit 904 may force the lossless gate drive circuit 900 to operate at a resonant frequency close to the switching frequency of the LLC resonant converter 200 based upon the real-time detected signal from the MEPT detector 902. As such, the lossless gate drive circuit 900 is capable of dynamically adjust its resonant frequency so that the lossless gate drive circuit 900 as well as the LLC resonant converter 200 can achieve higher efficiency.

The MEPT detector 902 includes a rectifier, decoupling capacitors C5 and C7, a load resistor R1 and a divider/filter circuit. The rectifier, as shown in FIG. 9, includes C1, C2, D1 and D2. The rectifier is employed to convert the ac voltage across node A and node B into a dc voltage.

The divider/filter circuit includes R2, R3 and C3. R2 and R3 form a voltage divider. An appropriate dc voltage signal is fed into the control circuit 904 through adjusting the ratio of R2 to R3. In addition, C3, R2 and R3 may form a filter to attenuate noise so that the control circuit 904 may receive a noise free dc signal.

In some embodiments, the resistance of R1 is equal to 330 ohm. The capacitance of C1 is equal to 1 nF. The capacitance of C2 is equal to 1 nF. The capacitance of C3 is equal to 2 nF. The capacitance of C5 is equal to 30 pF. The capacitance of C7 is equal to 30 pF. The resistance of R2 is equal to 20 Kohm. The resistance of R3 is equal to 2 Kohm.

It should be noted that the values given above are selected purely for demonstration purposes and are not intended to limit the various embodiments of the present invention to any particular values. A person skilled in the art will recognize that, depending on different application and design needs, the resistance and capacitance recited above may be changed to different values.

Figure 10:
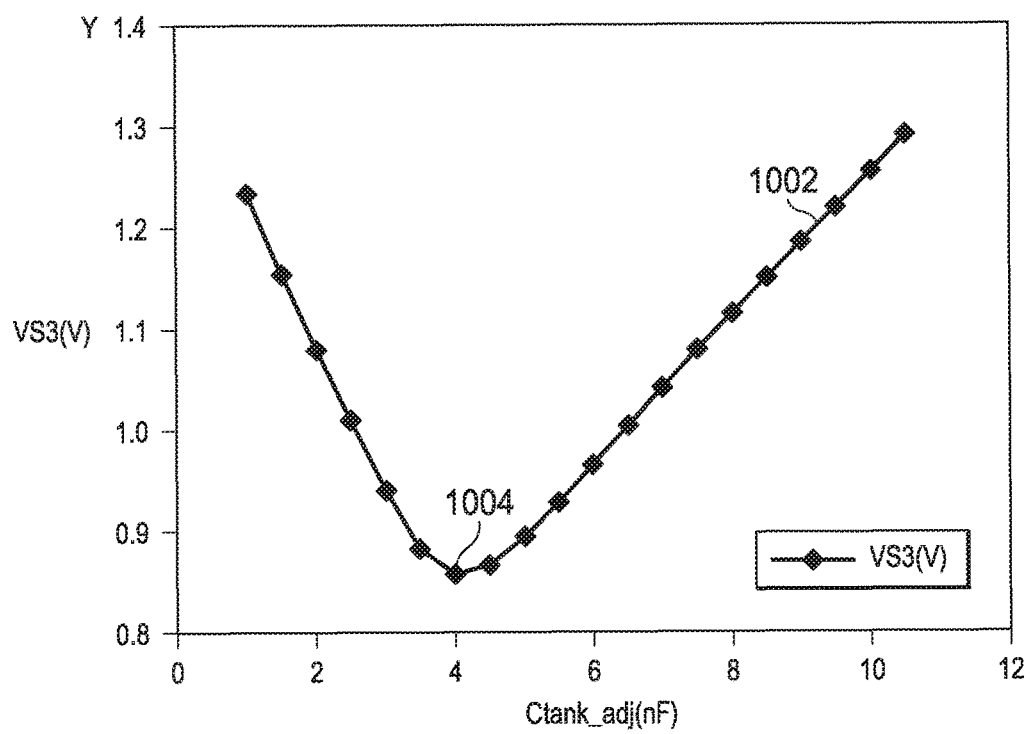
FIG. 10 illustrates a resonant process detection curve of the lossless gate drive circuit in FIG. 9 in accordance with various embodiments of the present disclosure.

FIG. 10 illustrates a resonant process detection curve of the lossless gate drive circuit in FIG. 9 in accordance with various embodiments of the present disclosure. The horizontal axis of FIG. 10 represents the capacitance of the resonant device of the lossless gate drive circuit 900. The vertical axis represents the output voltage VS3 (shown in FIG. 9) at the output of the MEPT detector 902.

The curve 1002 illustrates the output voltage VS3 of the MEPT detector 902. As shown in FIG. 10, the output voltage VS3 may reach its lowest point 1004 when the capacitance of the resonant device is about 4 nF. The lowest point 1004 shown in FIG. 10 indicates the resonant frequency of the lossless gate drive circuit 900 is approximately equal to the switching frequency of the LLC resonant converter 200. In other words, the LLC resonant converter 200 and the lossless gate drive circuit 900 may achieve high efficiency when the output voltage VS3 reaches its lowest point 1004.

A digital signal processor (DSP) may be employed to find the lowest point of VS3 and obtain the necessary capacitance through turning on/off the auxiliary switches shown in FIG. 9.

Figure 11:
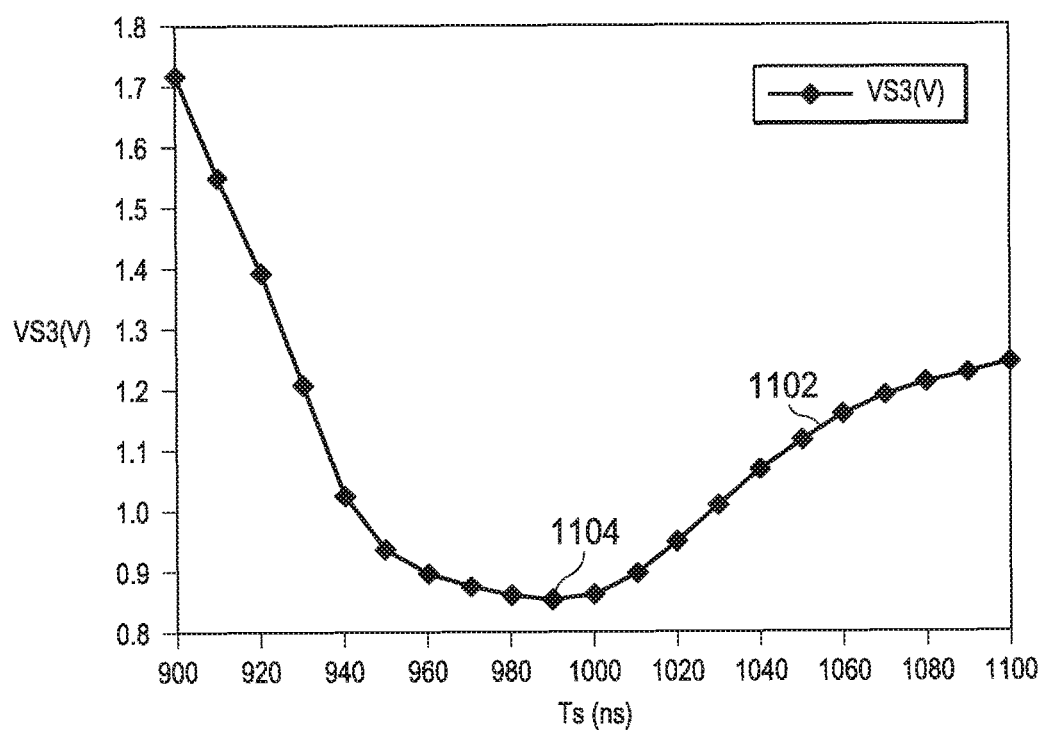
FIG. 11 illustrates another resonant process detection curve of the lossless gate drive circuit in FIG. 9 in accordance with various embodiments of the present disclosure.

FIG. 11 illustrates another resonant process detection curve of the lossless gate drive circuit in FIG. 9 in accordance with various embodiments of the present disclosure. The horizontal axis of FIG. 11 represents the switching period of the lossless gate drive circuit 900. The unit of the horizontal axis is nS. The vertical axis represents the voltage at the output voltage VS3 of the MEPT detector 902.

The curve 1102 illustrates the voltage at the output voltage VS3 of the MEPT detector 902. As shown in FIG. 11, the output voltage VS3 may reach its lowest point 1104 when the switching period of the lossless gate drive circuit 900 is about 990 nS. The lowest point 1104 shown in FIG. 11 indicates the resonant frequency of the lossless gate drive circuit 900 is approximately equal to the switching frequency of the LLC resonant converter 200. The method of finding the lowest point 1104 and adjusting the capacitance of the resonant device is similar to that shown in FIG. 10, and hence is not discussed herein.

Figure 12:
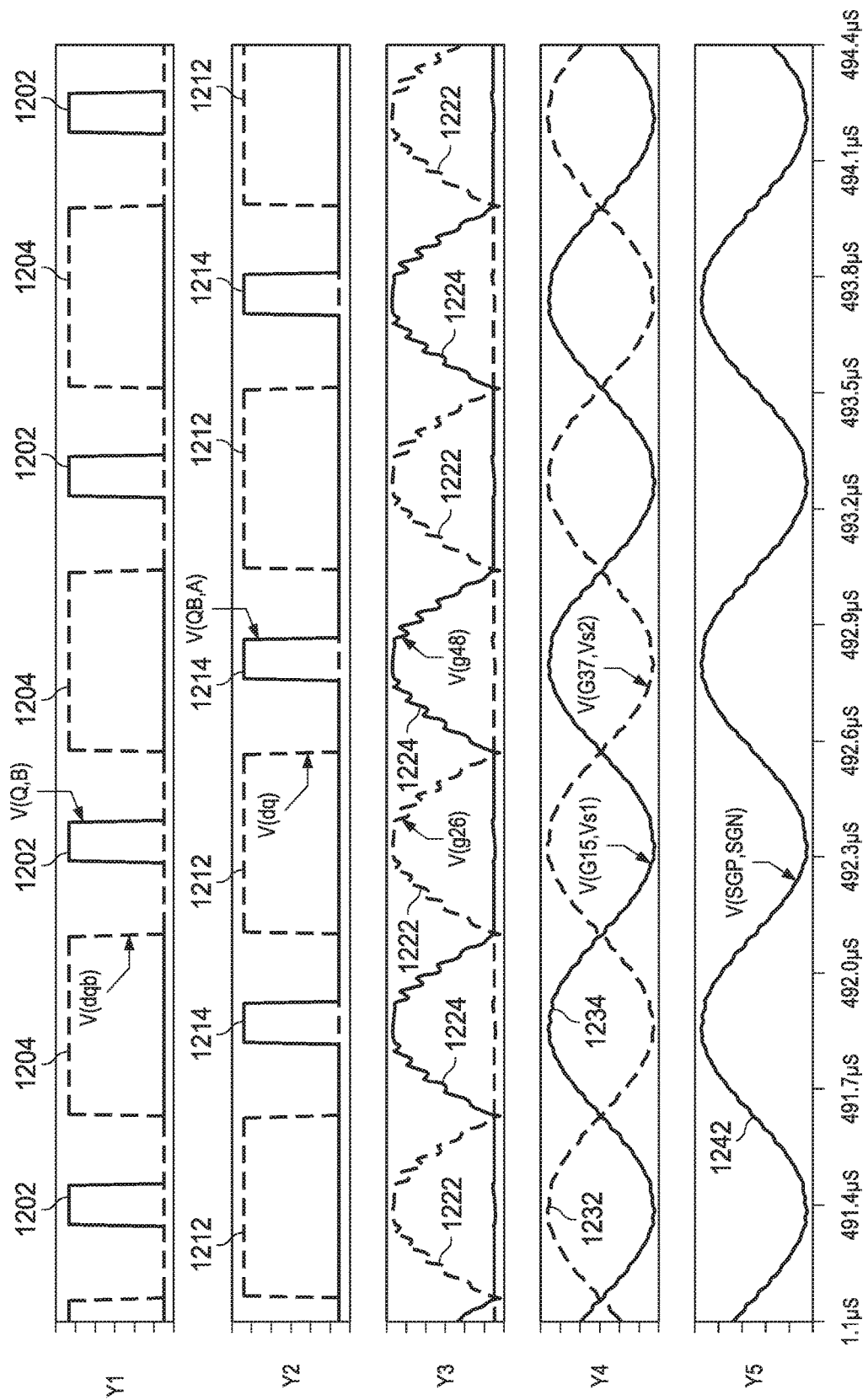
FIG. 12 illustrates switching waveforms of the lossless gate drive circuit in FIG. 9 in accordance with various embodiments of the present disclosure.

FIG. 12 illustrates switching waveforms of the lossless gate drive circuit in FIG. 9 in accordance with various embodiments of the present disclosure. The horizontal axis of FIG. 12 represents intervals of time. The unit of the horizontal axis is micro second. There may be five vertical axes. The first vertical axis Y1 represents a first group of gate drive signals of the H-bridge of the lossless gate drive circuit. The second vertical axis Y2 represents a second group of gate drive signals of the H-bridge of the lossless gate drive circuit.

The third vertical axis Y3 represents low-side gate drive signals of the LLC resonant converter 200. The fourth vertical axis Y4 represents high-side gate drive signals of the LLC resonant converter 200. The fifth vertical axis Y5 represents secondary gate drive signals of the LLC resonant converter 200.

In some embodiments, waveform 1202 is the gate drive signal of the transistor M19 shown in FIG. 3. Waveform 1204 is the gate drive signal of the transistor M18 shown in FIG. 3. Waveform 1212 is the gate drive signal of the transistor M20 shown in FIG. 3. Waveform 1214 is the gate drive signal of the transistor M17 shown in FIG. 3.

In some embodiments, waveform 1202 shows the duty cycle of the gate drive signal of the transistor M19 is in a range from about 5% to about 25%. Waveform 1204 shows the duty cycle of the gate drive signal of the transistor M18 is approximately equal to 50%. Waveform 1214 shows the duty cycle of the gate drive signal of the transistor M17 is in a range from about 5% to about 25%. Waveform 1212 shows the duty cycle of the gate drive signal of the transistor M20 is approximately equal to 50%.

In some embodiments, waveform 1222 shows the signal G26 shown in FIG. 3. G26 is used to drive a first low-side switch of the LLC resonant converter 200 (e.g., the switch Q2 shown in FIG. 2). Waveform 1224 shows the signal G46 shown in FIG. 3. G46 is used to drive a second low-side switch of the LLC resonant converter 200 (e.g., the switch Q4 shown in FIG. 2).

In some embodiments, waveform 1232 shows the signal G37 shown in FIG. 3. G37 is used to drive a first high-side switch of the LLC resonant converter 200 (e.g., the switch Q1 shown in FIG. 2). Waveform 1234 shows the signal G15 shown in FIG. 3. G15 is used to drive a second high-side switch of the LLC resonant converter 200 (e.g., the switch Q3 shown in FIG. 2).

In some embodiments, waveform 1242 shows the signal across node SGP and node SGN shown in FIG. 3. SGP and SGN are used to drive the switches of the rectifier (e.g., switches S1 and S2 shown in FIG. 2).

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    providing a resonant converter comprising:
        a switching network comprising a first high-side switch, a second high-side switch, a first low-side switch and a second low-side switch;
        a resonant tank coupled between the switching network and a transformer; and
        a rectifier coupled to a secondary side of the transformer;
    coupling a driver to the switching network and the rectifier, wherein the driver comprises:
        a bridge coupled between a bias voltage and ground;
        a resonant device coupled to the bridge; and
        a signal transformer having a primary winding coupled to the resonant device, a first secondary winding coupled to the rectifier, a second secondary winding coupled to the first high-side switch and a third secondary winding coupled to the second high-side switch;
    detecting a signal indicating a soft switching process of the driver; and
    adjusting a resonant frequency of the driver until the resonant frequency of the driver approximately matches a switch frequency of the resonant converter.

2. The method of claim 1, wherein the bridge comprises:
    a first switch and a second switch connected in series and coupled between the bias voltage and ground; and
    a third switch and a fourth switch connected in series and coupled between the bias voltage and ground, and wherein:
        a gate drive signal of the first low-side switch is applied to a common node of the first switch and the second switch; and
        a gate drive signal of the second low-side switch is applied to a common node of the third switch and the fourth switch.

3. The method of claim 2, further comprising:
adjusting a duty cycle of the first switch so that the duty cycle of the first switch is in a range from about 5% to about 25%;
adjusting a duty cycle of the second switch so that the duty cycle of the second switch is about 50%;
adjusting a duty cycle of the third switch so that the duty cycle of the third switch is in a range from about 5% to about 25%; and
adjusting a duty cycle of the fourth switch so that the duty cycle of the fourth switch is about 50%.

4. The method of claim 2, further comprising:
adjusting a duty cycle of the first switch so that the duty cycle of the first switch is less than 40%;
adjusting a duty cycle of the second switch so that the duty cycle of the second switch is in a range from about 40% to about 60%;
adjusting a duty cycle of the third switch so that the duty cycle of the third switch is less than 40%; and
adjusting a duty cycle of the fourth switch so that the duty cycle of the fourth switch is in a range from about 40% to about 60%.

5. The method of claim 2, wherein the resonant device comprises:
a fixed capacitance, a gate capacitance and a magnetizing inductance.

6. The method of claim 5, further comprising:
an adjustable capacitance coupled to the fixed capacitance, wherein:
the fixed capacitance is formed by a first capacitor coupled between the common node of the first switch and the second switch, and the common node of the third switch and the fourth switch; and
the adjustable capacitance is formed by a second capacitor and an auxiliary switch, wherein the second capacitor and the auxiliary switch are connected in series to form a switchable capacitor, and wherein the switchable capacitor is coupled between the common node of the first switch and the second switch, and the common node of the third switch and the fourth switch.

7. The method of claim 5, further comprising:
an adjustable capacitance coupled to the fixed capacitance, wherein:
the fixed capacitance is formed by a first capacitor coupled between the common node of the first switch and the second switch, and the common node of the third switch and the fourth switch; and
the adjustable capacitance is formed by a second capacitor, a first auxiliary switch, a third capacitor and a second auxiliary switch, and wherein:
the second capacitor and the first auxiliary switch are connected in series to form a first switchable capacitor, and wherein the first switchable capacitor is connected in parallel with the second switch; and
the third capacitor and the second auxiliary switch are connected in series to form a second switchable capacitor, and wherein the second switchable capacitor is connected in parallel with the fourth switch.

8. The method of claim 5, wherein:
the fixed capacitance is formed by a first capacitor connected in parallel with the first switch and a second capacitor connected in parallel with the third switch.

9. The method of claim 5, wherein:
the fixed capacitance is formed by a first capacitor connected in parallel with the second switch and a second capacitor connected in parallel with the fourth switch.

10. The method of claim 5, further comprising:
a capacitor connected in series with at least one winding of secondary windings of the signal transformer.

11. The method of claim 5, further comprising:
a blocking capacitor connected in series with the primary winding of the signal transformer.

12. A method comprising:
providing a resonant converter comprising:
a switching network comprising a first high-side switch, a second high-side switch, a first low-side switch and a second low-side switch;
a resonant tank coupled between the switching network and a transformer; and
a rectifier coupled to a secondary side of the transformer;
coupling a driver to the switching network and the rectifier, wherein the driver comprises:
a bridge coupled between a bias voltage and ground;
a resonant device coupled to the bridge; and
a signal transformer comprising a first winding coupled to the rectifier, a second winding coupled to the first high-side switch and a third winding coupled to the second high-side switch;
detecting a load level of the resonant converter; and
adjusting the bias voltage of the driver in response to different load conditions.

13. The method of claim 12, further comprising:
in response to a light load operating condition of the resonant converter, reducing the bias voltage of the driver; and
in response to a heavy load operating condition of the resonant converter, increasing the bias voltage of the driver.

14. The method of claim 12, further comprising:
varying the bias voltage of the driver when the resonant converter operates in a startup process.

15. The method of claim 12, further comprising:
detecting a signal indicating a soft switching process of the driver; and
adjusting a resonant frequency of the driver until the resonant frequency of the driver approximately matches a switch frequency of the resonant converter.

16. A method comprising:
providing a resonant converter comprising:
a switching network comprising a first high-side switch, a second high-side switch, a first low-side switch and a second low-side switch;
a resonant tank coupled between the switching network and a transformer; and
a rectifier coupled to a secondary side of the transformer;
coupling a driver to the switching network and the rectifier, wherein the driver includes a first winding coupled to the rectifier, a second winding coupled to the first high-side switch and a third winding coupled to the second high-side switch;
detecting a signal indicating a soft switching process of the driver; and
adjusting a resonant frequency of the driver until the resonant frequency of the driver approximately matches a switch frequency of the resonant converter.

17. The method of claim 16, wherein the driver comprises:
a bridge comprising a first driver switch and a second driver switch connected in series and a third driver switch and a fourth driver switch connected in series;
a signal transformer coupled to the bridge; and a resonant device coupled to the bridge, and wherein the resonant device comprises a fixed capacitance, gate capacitances of the switching network and the rectifier, and a magnetizing inductance of the signal transformer.

18. The method of claim 17, wherein:

a first common node of the first driver switch and the second driver switch is coupled to a gate of the first low-side switch; and a second common node of the third driver switch and the fourth driver switch is coupled to a gate of the second low-side switch.

19. The method of claim 18, further comprising:

detecting a voltage across the first common node and the second common node;

converting the voltage into a dc signal; and adjusting the resonant frequency of the driver until the resonant frequency of the driver approximately matches the switching frequency of the resonant tank.

20. The method of claim 19, further comprising:

during the step of adjusting the switching frequency of the driver until the switching frequency of the driver approximately matches the resonant frequency of the resonant tank, adding an adjustable capacitance into the resonant device through turning on an auxiliary switch.

* * * * *